(12) United States Patent
Kim et al.

(10) Patent No.: US 9,680,682 B2
(45) Date of Patent: Jun. 13, 2017

(54) METHOD AND DEVICE FOR DETECTING UPLINK SYNCHRONIZATION SIGNAL IN EACH STEP IN WIRELESS ACCESS SYSTEM SUPPORTING HIGH FREQUENCY BAND

(71) Applicant: LG ELECTRONICS INC., Seoul (KR)

(72) Inventors: Kitae Kim, Seoul (KR); Kilbom Lee, Seoul (KR); Jaehoon Chung, Seoul (KR); Jinmin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/906,960

(22) PCT Filed: Aug. 29, 2014

(86) PCT No.: PCT/KR2014/008071
§ 371 (c)(1),
(2) Date: Jan. 22, 2016

(87) PCT Pub. No.: WO2015/030524
PCT Pub. Date: Mar. 5, 2015

(65) Prior Publication Data
US 2016/0173315 A1 Jun. 16, 2016

Related U.S. Application Data

(60) Provisional application No. 61/871,835, filed on Aug. 29, 2013.

(51) Int. Cl.
*H04L 27/26* (2006.01)
*H04L 7/08* (2006.01)

(52) U.S. Cl.
CPC .......... *H04L 27/2655* (2013.01); *H04L 7/08* (2013.01); *H04L 27/2663* (2013.01)

(58) Field of Classification Search
CPC .... H04L 27/2655; H04L 27/2663; H04L 7/08
See application file for complete search history.

(56) References Cited

U.S. PATENT DOCUMENTS

| 2008/0310561 | A1 | 12/2008 | Song et al. | |
|---|---|---|---|---|
| 2010/0054235 | A1* | 3/2010 | Kwon | H04J 13/16 370/350 |
| 2011/0075651 | A1* | 3/2011 | Jia | H04B 7/0671 370/344 |

FOREIGN PATENT DOCUMENTS

| EP | 1533968 A2 | 5/2005 |
|---|---|---|
| EP | 2 439 973 A1 | 4/2012 |

(Continued)

*Primary Examiner* — Ross Varndell
(74) *Attorney, Agent, or Firm* — Birch, Stewart, Kolasch & Birch, LLP

(57) ABSTRACT

The present invention provides a method for detecting an uplink synchronization signal in a wireless access system supporting a high frequency band, a method for designing a detection filter for the same, and devices for supporting the methods. A method by which a base station detects a random access channel (RACH) signal in a wireless access system supporting a high frequency band, according to one embodiment of the present invention, comprises the steps of: allocating a cyclic shift value used in the base station; configuring a reception signal vector for signals transmitted through the RACH; deriving a cyclic shift candidate greater than or equal to a reference value from the reception signal vector by using a first detection filter; and detecting the RACH signal from the cyclic shift candidate by using a second detection filter, wherein the first detection filter and the second detection filter can be set on the basis of the cyclic shift value.

12 Claims, 12 Drawing Sheets

(56) References Cited

FOREIGN PATENT DOCUMENTS

| | | |
|---|---|---|
| JP | 2003-8475 A | 1/2003 |
| KR | 10-2001-0054994 A | 7/2001 |
| KR | 10-2008-0037495 A | 4/2008 |
| KR | 10-2010-0020472 A | 2/2010 |
| WO | WO 2008/025373 A1 | 3/2008 |

\* cited by examiner

METHOD AND DEVICE FOR DETECTING UPLINK SYNCHRONIZATION SIGNAL IN EACH STEP IN WIRELESS ACCESS SYSTEM SUPPORTING HIGH FREQUENCY BAND

CROSS REFERENCE TO RELATED APPLICATIONS

This application is the National Phase of PCT International Application No. PCT/KR2014/008071, filed on Aug. 29, 2014, which claims priority under 35 U.S.C. 119(e) to U.S. Provisional Application No. 61/871,835, filed on Aug. 29, 2013, all of which are hereby expressly incorporated by reference into the present application.

TECHNICAL FIELD

The present invention relates to a method for detecting an uplink synchronization signal in a wireless access system supporting a high frequency band, and a method for designing a detection filter for the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the problem lies on methods for efficiently detecting an uplink synchronization signal in a communication environment using a high frequency band.

Another object of the present invention is to provide a 2-step synchronization signal detection method for detecting a synchronization signal with low complexity.

Another object of the present invention is to provide a method for designing a detection filter for acquiring uplink synchronization in a high frequency band.

Another object of the present invention is to provide apparatuses supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides a method for detecting an uplink synchronization signal in a wireless access system supporting a high frequency band, a method for designing a detection filter for the same, and apparatuses supporting the methods.

In an aspect of the present invention, provided herein is a method for detecting a Random Access Channel (RACH) signal by a base station in a wireless access system supporting a high frequency band. the method includes allocating cyclic shift values used in the base station, configuring a received signal vector for signals transmitted on the RACH, deriving cyclic shift candidates equal to or larger than a reference value from the received signal vector, using a first detection filter, and detecting a RACH signal from the cyclic shift candidates using a second detection filter. The first detection filter and the second detection filter are configured based on the cyclic shift values.

In another aspect of the present invention, a base station for detecting an RACH signal in a wireless access system supporting a high frequency band includes a transmitter, a receiver, and a processor configured to detect the RACH signal. The processor is configured to allocate cyclic shift values used in the base station, configure a received signal vector for signals transmitted on the RACH, derive cyclic shift candidates equal to or larger than a reference value from the received signal vector, using a first detection filter, and detect a RACH signal from the cyclic shift candidates using a second detection filter. The first detection filter and the second detection filter are configured based on the cyclic shift values.

In the above aspects of the present invention, the first detection filter may be configured on the assumption that the number of effective channels of the RACH is 1. Herein, the first detection filter $G_m$ may be configured by $[s^{(m)_N}]$ where m represents the cyclic shift values, N represents a total length of a Zadoff-Chu sequence, and $\diamond$ represents a modulo operation.

The second detection filter may be configured in consideration of the number of effective channels of the RACH. Herein, the second detection filter $G_m$ may be configured by $[s^{(m)_N} \; s^{(m+1)_N} \; \ldots \; s^{(m+L-1)_N}]$ where m represents the cyclic shift values, L represents the number of effective channels, N represents a total length of a Zadoff-Chu sequence, and $\diamond$ represents a modulo operation.

The cyclic shift values may be set in consideration of the number of effective channels.

The cyclic shift candidates may be periods during which a sequence correlation derived from a Zero Correlation Zone (ZCZ) is equal to or larger than the reference value.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First, an uplink synchronization signal can be acquired efficiently in a communication environment using a high frequency band.

Secondly, a synchronization signal can be detected with low complexity based on a 2-step synchronization signal detection method.

Thirdly, a detection filter for acquiring uplink synchronization in a high frequency band can be designed.

Fourthly, an apparatus supporting the above methods can be provided.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
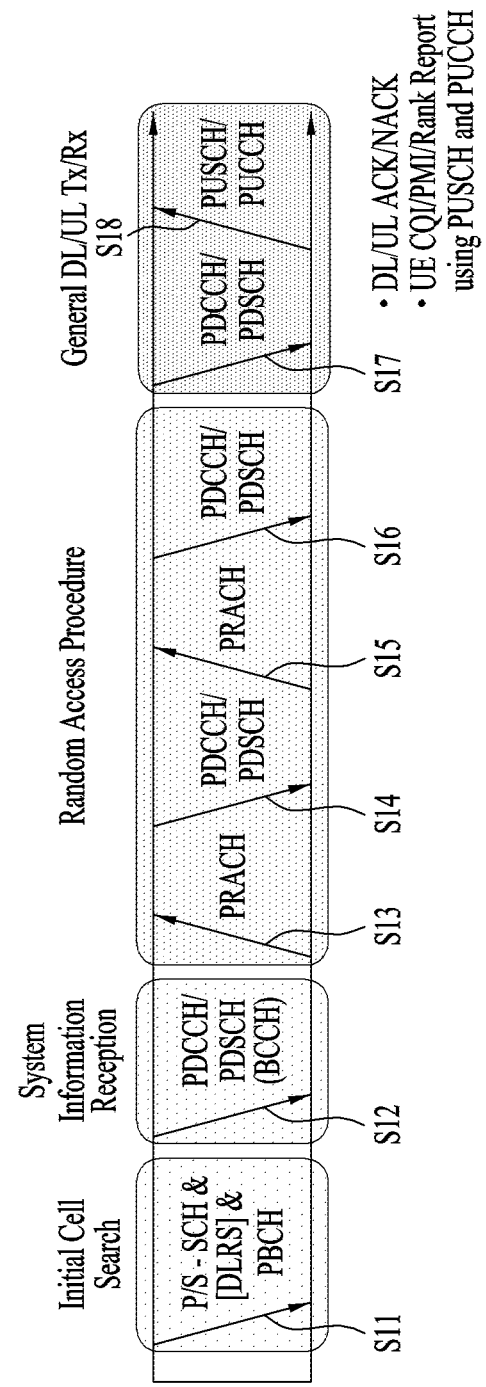
FIG. 1 illustrates physical channels and a general signal transmission method using the physical channels, which may be used in embodiments of the present invention.

Embodiments of the present invention described below in detail provide a method for transmitting and receiving a data symbol using a correlation between antennas that form a massive antenna, and apparatuses supporting the method.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an TFEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
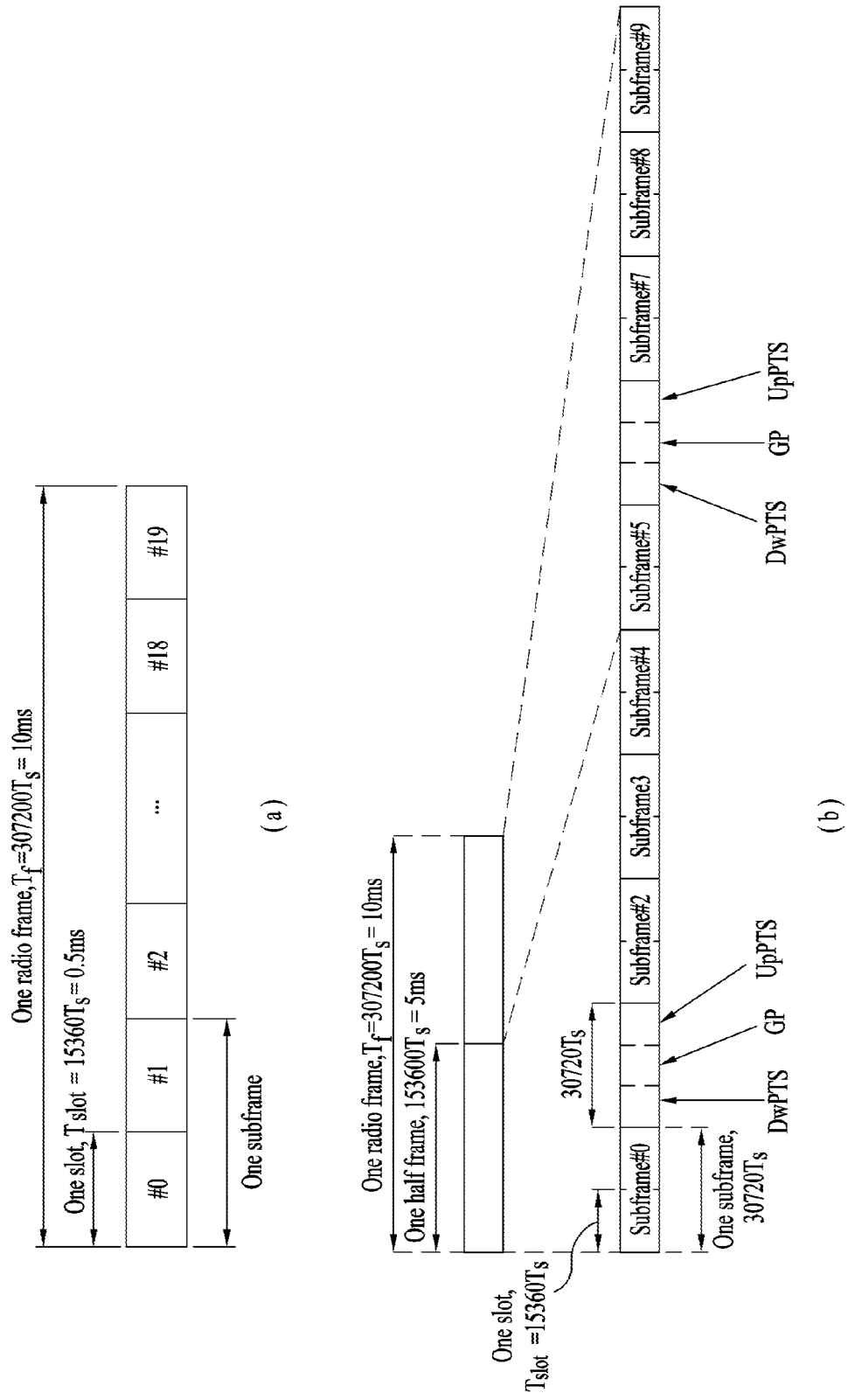
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
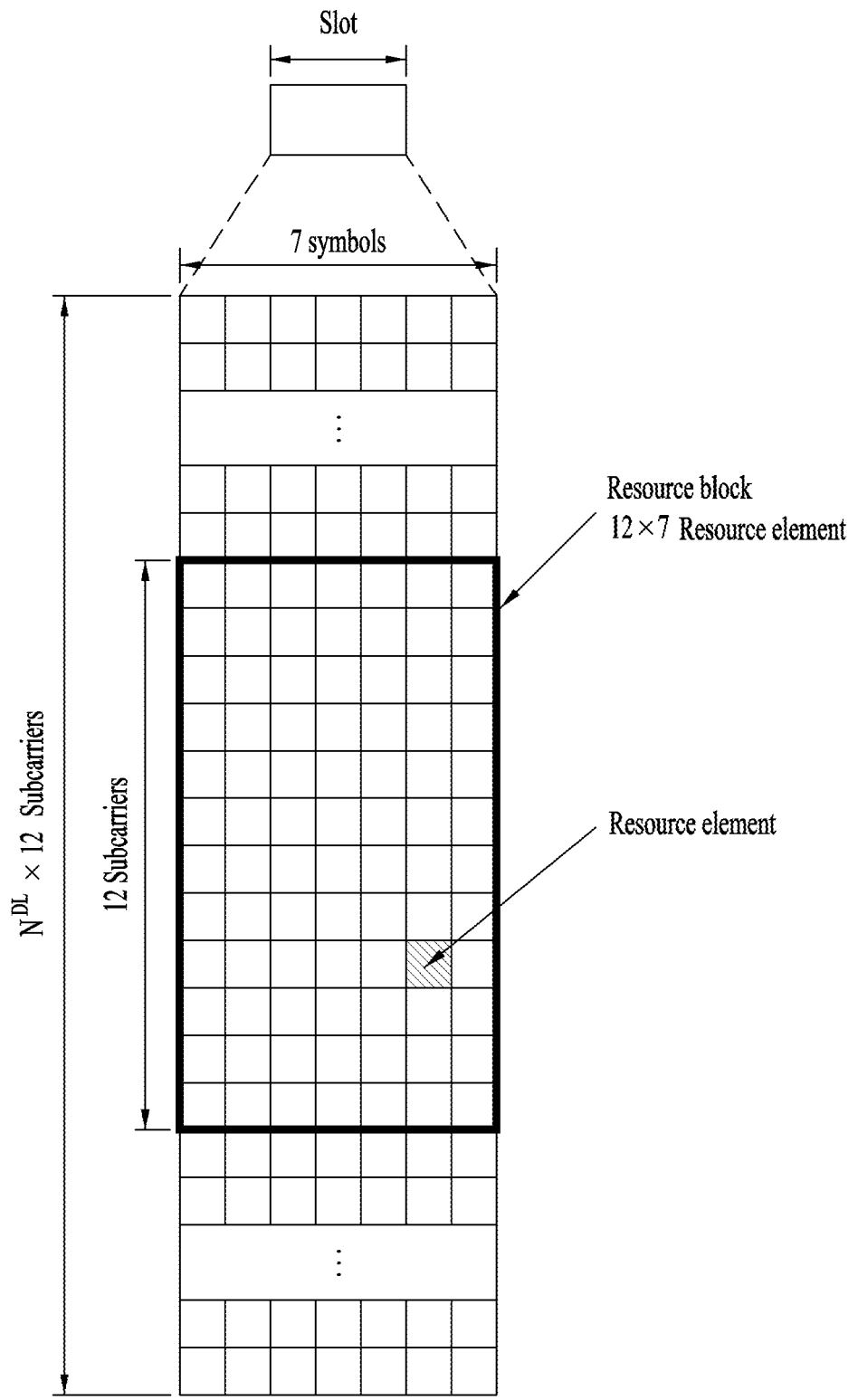
FIG. 3 illustrates a structure of a DownLink (DL) resource grid for the duration of one DL slot, which may be used in embodiments of the present invention.

Table FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
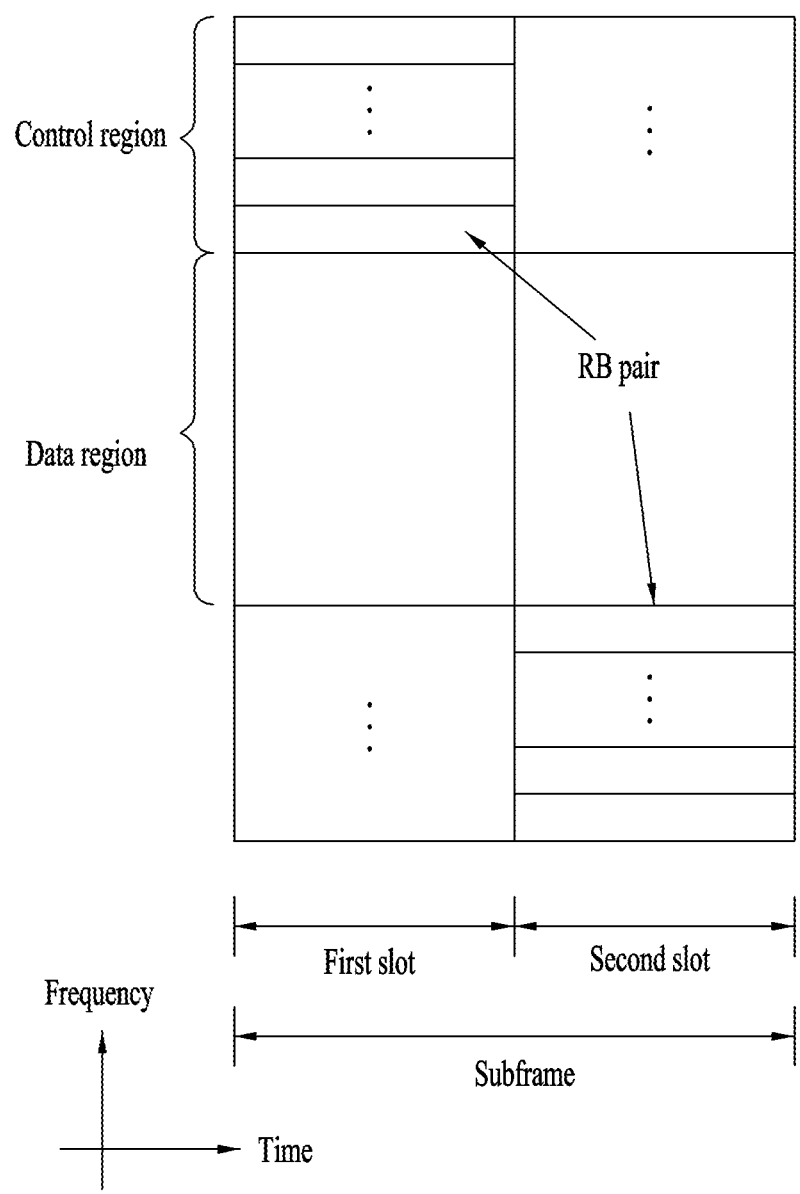
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
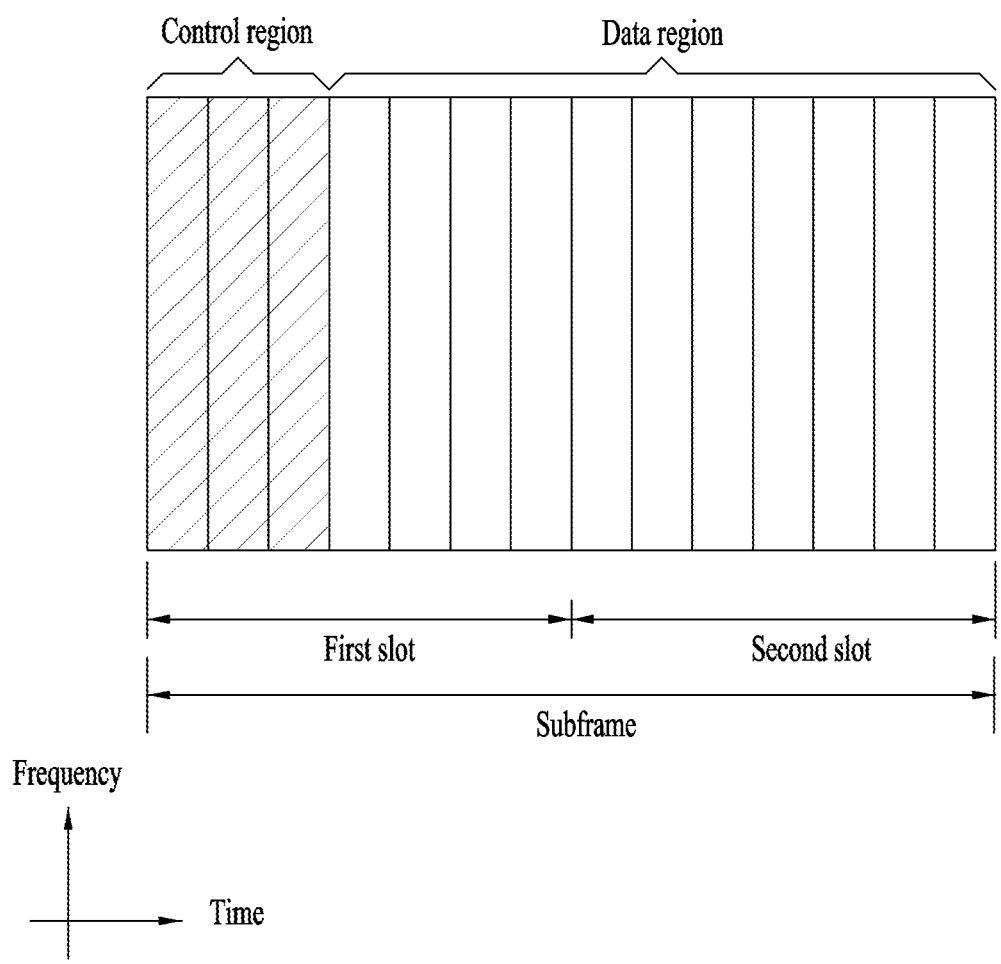
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group. Embodiments of the present invention described below in detail provide a method for transmitting and receiving a data symbol using a correlation between antennas that form a massive antenna and apparatuses supporting the method.

2. Wireless Access System Supporting Massive Antenna

Embodiments of the present invention provide a method for securing transmit diversity using a correlation between antennas in a communication environment supporting a massive antenna. The massive antenna is readily implemented in a high frequency band (a few GHz area) that allows a short distance between antennas.

In view of the nature of the massive antenna that many antennas are deployed in a narrow area, it may be impossible to implement all antennas in such a manner that they may be independent of each other with small correlations. On the other hand, if beamforming is applied to the massive antenna, a high correlation between antennas maximizes performance. Thus, extremely high and low correlations between antennas have their own advantages and disadvantages. Accordingly, with the correlation characteristic of the massive antenna, the service coverage of an eNB may be stably secured, and the effect may be maximized particularly when a control channel is transmitted.

Further, the embodiments of the present invention are applicable under the same principle even in a broadband communication situation using a high frequency band exceeding 3 GHz as well as a cellular band equal to or below 3 GHz. The embodiments of the present invention are applicable to small cells as well as legacy macro cells. Hereinbelow, a wireless access environment to which a massive antenna may be applied will be described.

2.1. Small Cell-Focused New Cell Introduction

The current 3GPP LTE-A system is a wireless access system operating in conformance to the Rel-10 to Rel-12 standards. A wireless access system to which the embodiments of the present invention are applied may be a system defined by the 3GPP LTE Rel-12 or below standards. To reinforce support of services per user, introduction of local area cells (i.e., small cells) and Local Area Access (LAA) is under consideration in the Rel-12 system.

Figure 6:
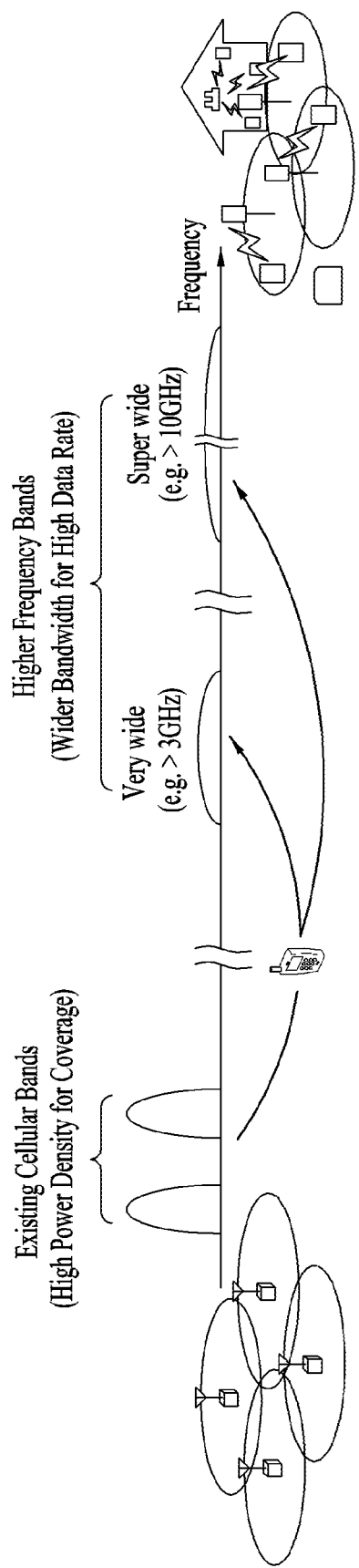
FIG. 6 illustrates the conceptual characteristics of a small cell.

FIG. 6 illustrates the conceptual characteristics of a small cell.

Referring to FIG. 6, the left side illustrates existing cellular bands, and the right side illustrates high frequency bands to which small cells are applied. That is, a small cell may operate in a wide system bandwidth having a higher center frequency than the frequency band of a legacy cellular system, LTE.

Further, small cells and legacy cellular cells may be co-existent. For example, basic cell coverage may be supported based on a control signal such as System Information (SI) in a legacy cellular band, whereas data may be transmitted with maximal transmission efficiency in a wide frequency band through a high small-cell frequency band.

Therefore, the concept of LAA to which the embodiments of the present invention are applicable is intended for UEs with low-to-medium mobility located in a narrow area, and the coverage of a small cell may be defined in units of 100 m smaller than the coverage of a legacy cell (i.e., a cell in a cellular system) which is defined in units of a few to hundreds of kilometers. Accordingly, as the distance between a UE and an eNB gets short and a high frequency band is used in a small cell, the small cell may have the following channel characteristics.

(1) Delay spread: As the distance between a UE and an eNB gets short, the delay of a signal may get short.

(2) Subcarrier spacing: If the same OFDM-based frames as in the legacy LTE system are used, a frequency band allocated to each UE is large. Therefore, a subcarrier spacing used in a small cell may be set to a value far larger than 15 kHz of the legacy LTE system.

(3) Doppler's frequency: Since a high frequency band is used in a small cell, there is a higher Doppler frequency than in a low frequency band, for the same UE speed. Thus, a coherent time may be extremely short.

2.2 Design of Random Access Channel (RACH) for Transmission in High Frequency Band Only when a UE is synchronized with an eNB, the UE may transmit a UL signal and may be scheduled for data transmission. That is, a main rule of an RACH is to enable asynchronous UEs to perform wireless access by using a transmission scheme in which signals from the asynchronous UEs are orthogonal to each other or are not overlapped with each other as much as possible.

2.2.1 Random Access Usage and Requirements

A main function of the RACH is performing an UL initial access and a short message transmission. In a WCDMA system, initial network access and short message transmission are performed through the RACH. On the contrary, an LTE system does not transmit a short message on the RACH. Compared to the WCDMA system, the RACH is configured separately from a legacy UL data transmission channel in the LTE system.

That is, a PUSCH signal has not a symbol structure with a basic subcarrier spacing Δf=15 kHz but an SC-FDMA structure with Δf=1.25 kHz in the LTE/LTE-A system. Once UL synchronization is acquired between the UE and the eNB, scheduling is performed for the UE in order to allocate orthogonal resources to the UE in the LTE system. The RACH is used in the following related scenarios:

(1) when the UE is in RRC_CONNECTED state without UL synchronization and needs to transmit new UL data or control information (e.g., an event-triggered measurement report);

(2) when the UE is in the RRC_CONNECTED state without UL synchronization, receives new DL data, and needs to transmit an ACKnowledgement/Negative ACKnowledgement (ACK/NACK) signal on UL in response to the new DL data;

(3) when The UE in the RRC_CONNECTED state wants to perform handover from a current serving cell to a target cell;

(4) when the UE needs a Timing Advance (TA) for positioning of the UE, that is, the UE seeks positioning in the RRC_CONNECTED state;

(5) when the UE transitions from RRC_IDLE state to the RRC_CONNECTED state, for example, for initial access or location update tracking; and (6) for recovery from radio link failure.

2.2.2 RACH Preamble Structure

Figure 7:
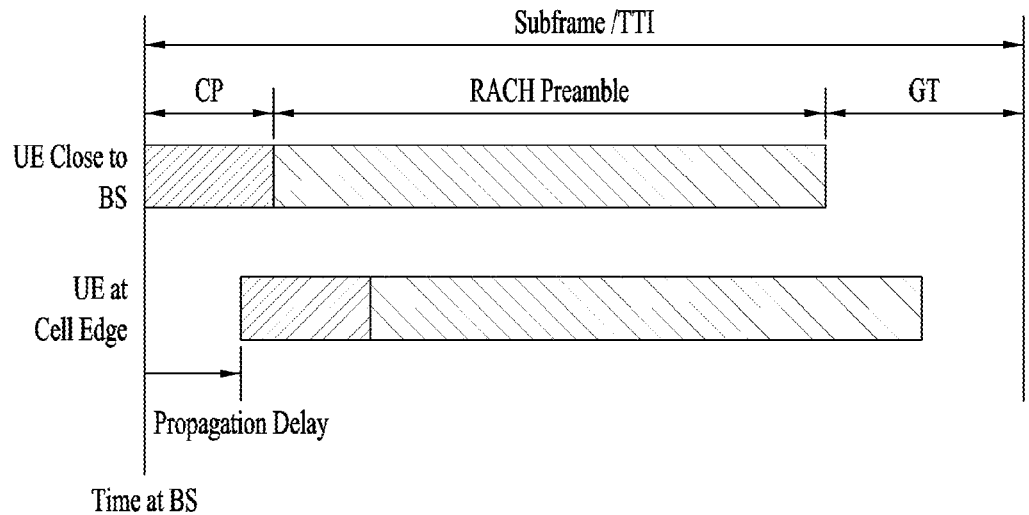
FIG. 7 illustrates an exemplary structure of a Random Access Channel (RACH) preamble.

FIG. 7 illustrates an exemplary structure of an RACH preamble.

To acquire UL synchronization, a UE transmits an RACH preamble (i.e., an RACH signal) to a BS on an RACH. The RACH preamble is composed of a Cyclic Prefix (CP) and an RACH sequence. The BS configures an RACH parameter to be used for generation of an RACH preamble, in consideration of a Guard Time (GT) based on a cell radius. The CP is configured in consideration of a maximum channel delay spread+a round trip time and the GT absorbs the round trip time. The CP is generated by inserting the last part of an OFDM symbol in a CP interval of the preamble. Thus, an RACH receiver may perform periodic correlation using the CP.

Referring to FIG. 7, a UE transmits an RACH preamble to a BS, assuming that a TA is 0 ms, that is, the UE has been synchronized with the BS. Therefore, a preamble transmitted by a UE near to the BS is almost aligned with a preamble received from the UE at the BS, and a preamble transmitted by a UE at a cell edge is received later with a propagation delay at the BS, as illustrated in FIG. 7. Because the BS has knowledge of an RACH sequence transmitted by each UE, the BS may perform a synchronization process based on the detected position of a preamble transmitted by each UE.

2.2.3 RACH Preamble Sequence Types

A plurality of sequences are available for RACH preambles. Among them, there are an auto-correlation-based Zadoff-Chu (ZC) sequence and a cross-correlation-based pseudo-random sequence. In general, if intra-cell interference is dominant (i.e., interference from an external cell is small), an auto-correlation-based sequence is used. On the contrary, if inter-cell interference is dominant, a cross-correlation-based sequence is preferred.

In the LTE system, a ZC sequence of length (N) 839 is used for the following reasons.

(1) The correlation between different preambles using the same frequency-time RACH resources should be small.

(2) Inter-cell interference should be optimized according to a cell size. That is, if a smaller cell generates more orthogonal preambles, the detection performance of a BS is improved.

(3) As there are more orthogonal preambles, detection performance is improved. To identify UEs, the LTE system uses 64 signatures, whereas the WCDMA system uses 16 signatures.

(4) The detection complexity of a BS should be reduced.

(5) A fast moving UE should be also supported.

To satisfy the above requirements, a ZC sequence described in [Equation 1] may be used for an RACH preamble.

$$x_u(n) = e^{-j\frac{\pi u n(n+1)}{N_{ZC}}}, 0 \leq n \leq N_{ZC} - 1 (N_{ZC} = 839) \quad \text{[Equation 1]}$$

In [Equation 1], u represents a root index of the ZC sequence, and $N_{ZC}$ represents the length of the ZC sequence.

However, a PN sequence described in [Equation 2] may be used in an environment having severe intra-cell interference between signatures used to identify UEs.

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

$$c(n)=(x_1(n+N_C)+x_2(n+N_C)) \bmod 2 \quad \text{[Equation 2]}$$

2.2.4 Transmission Band of RACH Preamble

Two significant factors considered in configuring the transmission band of an RACH preamble are a diversity gain and a transmission power limit for a UE. Unlike a BS, the performance of a power amplifier is limited for a UE. Accordingly, if a wide frequency band is allocated for RACH preamble transmission, energy per resource unit/resource element may get low, whereas frequency diversity may be maximized. On the contrary, if a narrow band is allocated for RACH preamble transmission, energy per resource unit/resource element may get high, whereas frequency diversity may be minimized.

Although 1.08 MHz, 2.16 MHz, 4.5 MHz, and 50 MHz (having 6 RBs, 12 RBs, 25 RBs, and 50 RBs, respectively) were candidates for an actual LTE RACH transmission band, 1.08 MHz was finally determined as the RACH transmission band because 6 RBs are sufficient to satisfy a non-detection probability of 1% in an RACH non-detection probability comparison.

2.3 Method for Configuring Zero Correlation Zone (ZCZ) of RACH Sequence Reflecting High Frequency Band Property When designing an RACH sequence, an RACH subcarrier spacing $\Delta f_{RA}$ is set to be small, about 1/12 of a legacy basic subcarrier spacing $\Delta f$ for data in the LTE system. Finally, the basic subcarrier spacing $\Delta f$ is 15 kHz and the RACH subcarrier spacing $\Delta f_{RA}$ is 1.25 kHz in the LTE system.

If the subcarrier spacing of a high frequency band channel is smaller than the basic subcarrier spacing, its impact on a Doppler frequency gets great and thus the detection performance of an RACH preamble at a BS may be degraded. For example, a UE moving at the same speed basically experiences a 15 times stronger Doppler effect during transmission in a high frequency band with a center frequency of 30 GHz than with a center frequency of 2 GHz. As a result, reduction of $\Delta f_{RA}$ in an RACH for high frequency band transmission as in the legacy LTE system may degrade performance significantly.

In general, as $\Delta f_{RA}$ is smaller, the number of channel taps corresponding to effective channels is 1 and thus the BS may assume that the number of effective multiple paths of a channel is 1. Therefore, the BS may identify each UE or estimate a timing difference by performing correlation on an RACH sequence transmitted from the UE, using a small $\Delta f_{RA}$ value. However, the Doppler effect should be considered for a high frequency channel and thus the RACH subcarrier spacing should be set to be equal to the basic subcarrier spacing. In this case, it may not be assumed that the number of channel taps corresponding to effective channels is 1.

Figure 8:
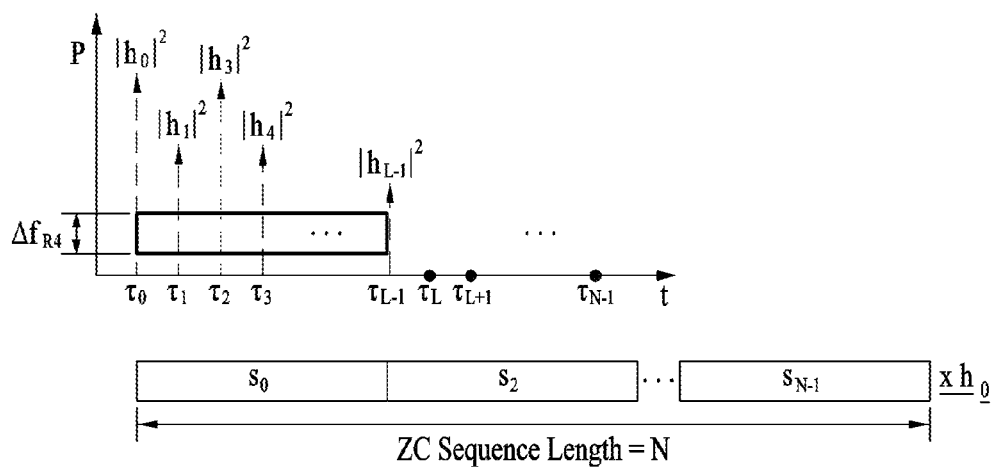
FIG. 8 illustrates the concept of generation of an effective single path and reception of a sequence at a Base Station (BS), when an RACH subcarrier spacing is small.
Figure 9:
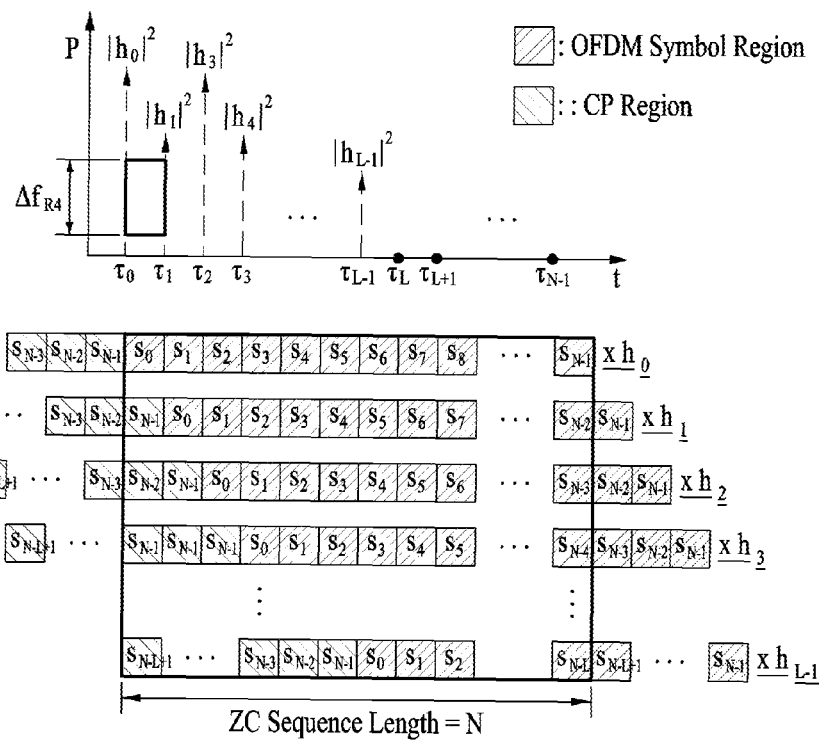
FIG. 9 illustrates the concept of generation of effective multiple paths and reception of a sequence at a BS, when an RACH subcarrier spacing is large.

FIG. 8 illustrates the concept of generation of an effective single path and reception of a sequence at a BS, when an RACH subcarrier spacing is small, and FIG. 9 illustrates the concept of generation of effective multiple paths and reception of a sequence at a BS, when an RACH subcarrier spacing is large.

Referring to FIG. 8, when a ZC sequence $s_0, s_1, s_2, s_3, \ldots, s_{N-1}$ is transmitted on an RACH having a relatively small subcarrier spacing, the time-domain length of an RACH transmission symbol is lengthened and thus an effective channel period is assumed to be a single tap. That is, FIG. 8 is based on the assumption that an RACH preamble is used in a bandwidth supported by a legacy cellular system (e.g., an LTE/LTE-A system).

Referring to FIG. 9, when a ZC sequence is transmitted on $s_0, s_1, s_2, s_3, \ldots, s_{N-1}$ is transmitted on an RACH having a relatively large subcarrier spacing, the time-domain length of an RACH transmission symbol is shortened and thus an effective channel period may include multiple paths. In this case, as many correlations as the number of overlaps between the period of each sequence sample of an RACH preamble and L multiple paths should be performed. That is, as the subcarrier spacing is larger, the number of multiple paths is increased and the number of correlations to be considered in the BS is also increased to the number of multiple paths. Consequently, the RACH signal reception complexity of the BS may increase rapidly.

In FIGS. 8 and 9, $h_0, h_1, \ldots, h_{L-1}$ represents channels on which an RACH preamble is transmitted, and $s_0, s_1, s_2, s_3, \ldots, s_{N-1}$ represents a ZC sequence. To maximize the detection performance of a synchronization signal, the BS should ensure selection of a most advancing channel tap $h_0$ from among multiple paths. If the BS is capable of selecting only $h_1, h_2, h_3, \ldots, h_{L-1}$ performance may be degraded in estimating an accurate UL TA.

3. Method for Detecting UL Synchronization Signal

Embodiments of the present invention provide methods for detecting a UL synchronization signal, suitable for a communication environment using a high frequency band.

The present invention provides methods for designing a synchronization signal detection filter in consideration of the relationship between the channel characteristics of a high frequency band and the subcarrier spacing of a synchronization signal. Since the high frequency band can be used for broadband communication, the period of a single sample may get extremely short in the time domain. In this environment, a channel necessarily experiences a multipath channel delay. Therefore, a synchronization signal detection filter should be designed in consideration of the multipath channel delay.

Further, to allow a BS to detect a synchronization signal with low complexity, a 2-step synchronization signal detection process is provided. Meanwhile, if a ZCZ is considered, the BS may estimate an accurate symbol timing at which each UE transmits a synchronization signal as well as it may detect a synchronization signal from each UE. While the embodiments of the present invention relate to methods for detecting a UL synchronization signal, suitable for a high-frequency broadband communication environment, the usages of the methods are not limited to small cells.

Now, a description will be given of methods for designing a detection filter for detecting an RACH preamble being a synchronization signal in a high frequency band.

3.1 Design of Synchronization Signal Detection Filter

If there are multipath delay channels for multiple users in a high frequency band, a BS may detect accurate RACH sequences only by summing sequence correlation values for respective multiple paths. [Equation 3] describes RACH signals received on the multipath delay channels by the BS.

$$r=S_n h + n \quad \text{[Equation 3]}$$

In [Equation 3], r represents an N×1 received signal vector and N represents the length of a ZC sequence described in [Equation 1]. It is assumed that a sequence with a cyclic shift 'n=0' has been allocated to a first UE (UE#1). Referring to FIG. 9, if the received signal vector r is configured according to [Equation 3], each element may be defined by [Equation 4], [Equation 5], and [Equation 6].

$$S_{n=0} = [s^{(\langle n \rangle_N)} s^{(\langle n+1 \rangle_N)} \ldots s^{(n+N-1)}] = \quad \text{[Equation 4]}$$

$$[s^{(0)} s^{(1)} \ldots s^{(N-1)}] = \begin{bmatrix} s_0 & s_{N-1} & \ldots & s_1 \\ s_1 & s_0 & \ldots & s_2 \\ \vdots & \vdots & \ddots & \vdots \\ s_{N-1} & s_{N-2} & \ldots & s_0 \end{bmatrix}$$

$$h = [h_0 \ h_1 \ h_2 \ \ldots \ h_{L-1} \ 0 \ 0 \ \ldots \ 0]^T \quad \text{[Equation 5]}$$

$$n = [n_0 \ n_1 \ n_2 \ \ldots \ n_{L-1}]^T \quad \text{[Equation 6]}$$

[Equation 4] describes an N×N ZC sequence matrix $S_0$, [Equation 5] describes an N×1 channel vector h, and [Equation 6] describes an N×1 Additive White Gaussian Noise (AWGN) vector n. $s^{(i)}$ represents an N×1 ZC sequence cyclically shifted by i. In [Equation 4], $(\langle \ \rangle_m)$ represents a modulo 'm' operation. In [Equation 5], $h_0, h_1, \ldots, h_{L-1}$ represent effective multiple delay channels and a total channel length is L. The remaining part (N−L) of the ZC sequence length except for the effective channel length L may be filled with a zero sequence.

A detection filter capable of detecting UEs that have transmitted RACH signals, that is, an N×L G matrix may be defined by the following equation.

$$G_m = [s^{(\langle m \rangle_N)} s^{(\langle m+1 \rangle_N)} \ldots s^{(\langle m+L-1 \rangle_N)}] = \quad \text{[Equation 7]}$$

$$\begin{bmatrix} S_{\langle m \rangle_N} & S_{\langle m-1 \rangle_N} & \ldots & S_{\langle m+N-L+1 \rangle_N} \\ S_{\langle m+1 \rangle_N} & S_{\langle m \rangle_N} & \ldots & S_{\langle m+N-L+2 \rangle_N} \\ \vdots & \vdots & \ddots & \vdots \\ S_{\langle m-1 \rangle_N} & S_{\langle m-2 \rangle_N} & \ldots & S_{\langle m+N-L \rangle_N} \end{bmatrix}$$

In [Equation 7], $s^{(\langle m+L-1 \rangle_N)}$ represents an N×1 ZC sequence vector cyclically shifted by $\langle m+L-1 \rangle_N$, 'm' represents a cyclic shift value used by a specific UE, L represents the number of effective channel delays, and N represents the total length of a ZC sequence. If m=0, the detection filter G matrix may be expressed as the following [Equation 8].

$$G_0 = [s^{(0)} s^{(1)} \ldots s^{L-1}] = \begin{bmatrix} S_0 & S_{N-1} & \ldots & S_{N-L+1} \\ S_1 & S_0 & \ldots & S_{N-L+2} \\ \vdots & \vdots & \ddots & \vdots \\ S_{N-1} & S_{N-2} & \ldots & S_{L-1} \end{bmatrix} \quad \text{[Equation 8]}$$

An orthogonal-independent cyclic shift value 'm' allocated to each UE is allocated in units described in [Equation 9].

$$m = 0, (N_{CS} + L), \ldots, \left\lfloor \frac{N}{N_{CS} + L} \right\rfloor - 1 \quad \text{[Equation 9]}$$

This is because the size of a cyclic shift-based ZCZ allocated to each user is $N_{CS}+L$, where $N_{CS}$ represents a cyclic shift value used for generation of an RACH preamble in the LTE/LTE-A system. Since the size of a sample carrying an actual signal in a ZCZ is 'L', the detection filter G is an N×L matrix.

The BS detects an RACH sequence for a UL synchronization signal by the following [Equation 10].

$$\hat{m} = \arg\max_{m} \|G_m^H r\|^2 \quad \text{[Equation 10]}$$

That is, the BS detects a point at which a peak value is obtained by multiplying the N×1 reception vector r by the Hermitian matrix of the detection filter G matrix formed based on the cyclic shift value 'm' allocated to each UE.

For example, it is assumed that the total length of an RACH sequence, N is 12 and the size of a ZCZ, $N_{CS}$ is 3. If an effective channel length (i.e., an effective channel tap) L is 3, the ZC sequence may support two UEs in total. Herein, it is assumed that a first cyclic shift value (m=0) has been allocated to a first UE (UE#0) and a seventh cyclic shift value (m=6) has been allocated to a second UE (UE#1). Once the BS performs detection for the first UE, [Equation 10] may be developed to [Equation 11].

$$\hat{m} = \arg\max_{m} \|G_m^H r\|^2 = \arg\max_{m} \|G_m^H S_n h + G_m^H n\|^2 \rightarrow \quad \text{[Equation 11]}$$

$$\|G_0^H S_0 h\|^2 = \left\| \begin{bmatrix} s_0^* & s_1^* & \ldots & s_{11}^* \\ s_{11}^* & s_0^* & \ldots & s_{10}^* \\ \vdots & \vdots & \ddots & \vdots \\ s_{10}^* & s_{11}^* & \ldots & s_9^* \end{bmatrix} \begin{bmatrix} s_0 & s_{11} & \ldots & s_1 \\ s_1 & s_0 & \ldots & s_2 \\ \vdots & \vdots & \ddots & \vdots \\ s_{11} & s_{10} & \ldots & s_0 \end{bmatrix} \begin{bmatrix} h_0 \\ \vdots \\ h_2 \\ 0_{9 \times 1} \end{bmatrix} \right\|^2$$

$$= \left\| [I_{3 \times 3} \ 0_{3 \times 9}] \begin{bmatrix} h_0 \\ \vdots \\ h_2 \\ 0_{9 \times 1} \end{bmatrix} \right\|^2 = |h_0|^2 + |h_1|^2 + |h_2|^2$$

Referring to [Equation 11], a UL synchronization signal received at the BS is expressed as the sum of power of channels that a UL synchronization signal transmitted by the first UE has experienced. In the same manner as in [Equation 11], a detection result of a UL synchronization signal transmitted by the second UE may be given as [Equation 12].

$$\hat{m} = \arg\max_{m} \|G_m^H r\|^2 = \arg\max_{m} \|G_m^H S_n h + G_m^H n\|^2 \quad \text{[Equation 12]}$$

$$\rightarrow \|G_6^H S_6 h\|^2 = \left\| \begin{bmatrix} s_6^* & s_7^* & \ldots & s_5^* \\ s_5^* & s_6^* & \ldots & s_4^* \\ s_4^* & s_5^* & \ldots & s_3^* \end{bmatrix} \begin{bmatrix} s_6 & s_5 & \ldots & s_7 \\ s_7 & s_6 & \ldots & s_8 \\ \vdots & \vdots & \ddots & \vdots \\ s_5 & s_4 & \ldots & s_6 \end{bmatrix} \begin{bmatrix} h_0' \\ \vdots \\ h_1' \\ 0_{9 \times 1} \end{bmatrix} \right\|^2$$

$$= \left\| [I_{3 \times 3} \ 0_{3 \times 9}] \begin{bmatrix} h_0' \\ \vdots \\ h_2' \\ 0_{9 \times 1} \end{bmatrix} \right\|^2 = |h_0'|^2 + |h_1'|^2 + |h_2'|^2$$

Because the final cyclic shift value allocated to the UE is 6 (m=6), if a final value calculated by [Equation 12] is equal to or larger than a reference value, the BS may confirm reception of an RACH signal. Accordingly, a detection filter $G_m$ may be a filter representing the sequence detection period of each UE based on a cyclic shift value used for a ZC sequence transmission by the UE.

Herein, m represents a ZCZ value based on a cyclic shift value allocated to each UE. Also, m is determined in consideration of the total number of effective channel delays, L. Finally, the BS may detect UEs that have transmitted UL synchronization signals by allocating m values to the respective UEs. Allocation of the m values means that if the BS broadcasts information about the m values on a broadcast channel, each UE may configure an RACH signal using an m value.

Figure 10:
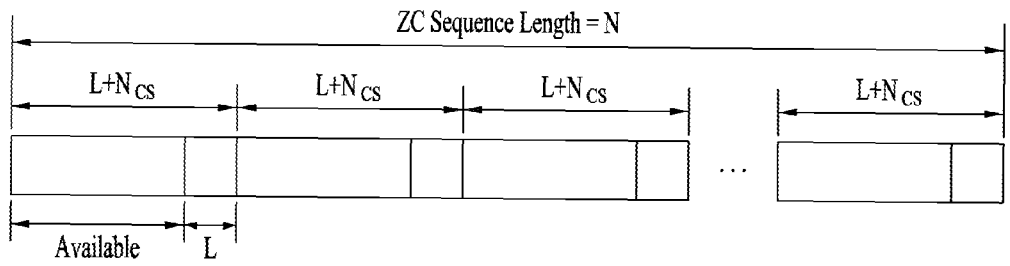
FIG. 10 illustrates one of methods for configuring a Zero Correlation Zone (ZCZ) in consideration of an effective delay L of a channel.

In embodiments of the present invention, the cyclic shift period of an entire ZC sequence is set as illustrated in FIG. 10 because a maximum delay allowed for each UE is limited to $N_{CS}$ and the effective channel delay period L is introduced to prevent overlap between ZCZs. A maximum reception delay of the $N_{CS}$ period is allowed for an RACH sequence having a different cyclic shift value, transmitted by each UE. FIG. 10 illustrates one of methods for configuring a ZCZ in consideration of the effective channel delay L.

Figure 11:
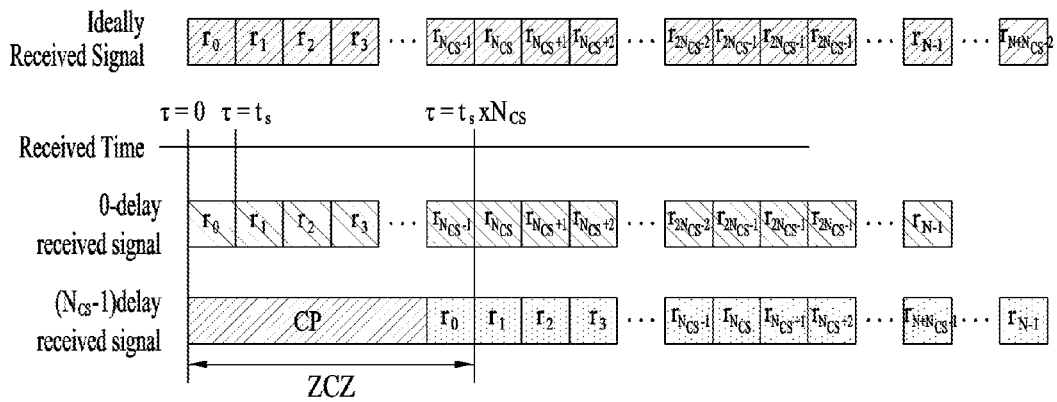
FIG. 11 illustrates one of methods for extracting a reception vector r according to a time delay within a ZCZ.

FIG. 11 illustrates one of methods for extracting a reception vector r according to a time delay within a ZCZ.

If a BS receives RACH signals from UEs without any time delay, the reception vector r is expressed as [Equation 13]. If the BS receives an RACH signal from a remotest UE (e.g., a UE located at a cell edge) with a delay of up to $N_{CS}-1$, the reception vector r is expressed as [Equation 14].

$$r_0 = [r_0 \ r_1 \ r_2 \ \ldots \ r_{N-1}]^T \qquad \text{[Equation 13]}$$

$$r_{N_{CS}-1} = [r_{N_{CS}-1} \ r_{N_{CS}} \ r_{N_{CS}+1} \ \ldots \ r_{N_{CS}+N-2}]^T \qquad \text{[Equation 14]}$$

That is, the BS sequentially configures received signal vectors r each having length N, for a received signal delay of up to $N_{CS}$, and determines RACH detection by correlations with the detection filter G matrix. Herein, it is determined that the detection complexity incurred by multiple paths generated due to the afore-described effective channel delays has been increased or decreased by ×L.

Therefore, the present invention proposes a stepwise RACH detection method for reducing detection complexity as follows.

3.2 2-Step UL Synchronization Signal Detection Method 3.2.1 First Detection Step The BS detects a period during which a sequence correlation derived from each ZCZ is equal to or larger than a reference value, assuming that multiple delay channels are a single effective channel in a first detection step (i.e., an initial detection step). It is assumed that the reference value is set in a channel environment and/or a system.

A ZCZ index 'n' allocated to each UE is set to one of cyclic shift values 'm' determined by [Equation 9]. The reason for using a ZCZ value is to prevent overlap between ZC sequences (i.e., RACH signals) transmitted by UEs, which might otherwise take place due to a reception delay caused by different positions of a plurality of UEs, and to perform timing advance.

Further, a ZCZ is set to be as long as the effective channel length 'L' in order to determine accurate reception positions of ZC sequences received in multiple paths. However, if a sequence correlation operation for the ZC sequence length N is performed for the effective channel length L, the complexity increases from N×1 to N×L.

The resulting increase in the reception complexity of the BS may bring about a synchronization signal detection delay. Because signal detection should be performed for all ZC sequences in view of a multi-user-based UL control channel structure, the signal detection complexity of the BS increases.

Accordingly, the detection filter G is designed on the assumption that the detection filter G matrix partially has effective channel periods or has a single effective channel period in an extreme case in the first detection step. For the convenience of description, the detection filter G matrix used in the first detection step will be referred to as a first detection filter. That is, it is preferred to configure the first detection filter, i.e., the G matrix used in the first detection step as an N×1 matrix or an N×i, (i<L) matrix.

The BS may specify a UE that has transmitted a UL synchronization signal by configuring the first detection filter being the G matrix based on the assumption that the effective channel length L is 1 in the first detection step. Therefore, the initial detection step amounts to detection of a point having a highest channel gain among total effective channels.

However, this point does not necessarily a time-aligned position. The BS may just determine that an RACH signal is currently received from some UE in RACH resources allocated without overlap on a user basis in the first detection step.

Therefore, the detection filter G matrix described in [Equation 7] is modified to [Equation 15] in the first detection step.

$$G_m = [s^{(\langle m \rangle_N)} s^{(\langle m+1 \rangle_N)} \ldots s^{(\langle m+L-1 \rangle_N)}] = \qquad \text{[Equation 15]}$$

$$\begin{bmatrix} S_{\langle m \rangle_N} & S_{\langle m-1 \rangle_N} & \cdots & S_{\langle m+N-L+1 \rangle_N} \\ S_{\langle m+1 \rangle_N} & S_{\langle m \rangle_N} & \cdots & S_{\langle m+N-L+2 \rangle_N} \\ \vdots & \vdots & \ddots & \vdots \\ S_{\langle m-1 \rangle_N} & S_{\langle m-2 \rangle_N} & \cdots & S_{\langle m+N-L \rangle_N} \end{bmatrix}$$
$$\downarrow$$

$$G_m = [s^{(\langle m \rangle_N)}] = \begin{bmatrix} S_{\langle m \rangle_N} \\ S_{\langle m+1 \rangle_N} \\ \vdots \\ S_{\langle m-1 \rangle_N} \end{bmatrix}$$

The BS may derive candidates for cyclic shift values 'm' used by UEs that have transmitted the received RACH signals, using the first detection filter determined by [Equation 15]. Herein, the BS may select one or more cyclic shift values equal to or larger than a reference value as candidates for a second detection step, from among correlated cyclic shift values.

3.2.2 Second Detection Step

For ZCZ candidates derived in the first detection step, the BS may derive accurate sequence correlation values and delay values by applying all of the effective channel delay L to the ZCZ candidates. In other words, the BS may perform a second detection step for detecting an RACH signal by configuring a second detection filter for the effective channel L, with respect to the cyclic shift candidates detected through the first detection filter described in section 3.2.1.

An object of the second detection step lies in that the BS acquires accurate UL time synchronization with a UE in a ZCZ. Therefore, the second detection filter may be configured as the G matrix described in [Equation 7] for the effective channel delay L. That is, the second detection filter is configured as an N×L matrix according to [Equation 7].

As a consequence, the BS configures the second detection filter as described in [Equation 7] for the entire effective channel L and performs the second detection step only on the ZCZ candidates derived in the first detection step. In this manner, the BS may acquire accurate time synchronization. However, the power levels of effective channels are not always arranged in the order of $h_0 > h_1 > h_2 > \ldots > h_{L-1}$. That is, even though $h_0$ is a preferred channel, the reception channel having the highest power does not mean accurate time synchronization.

Therefore, only when the second detection filter is accurately aligned for the total effective channels, the ZC sequence correlation value is largest. Thus, the BS may detect accurate time synchronization at a point of alignment with $h_0$, as illustrated in FIG. 12.

Figure 12:
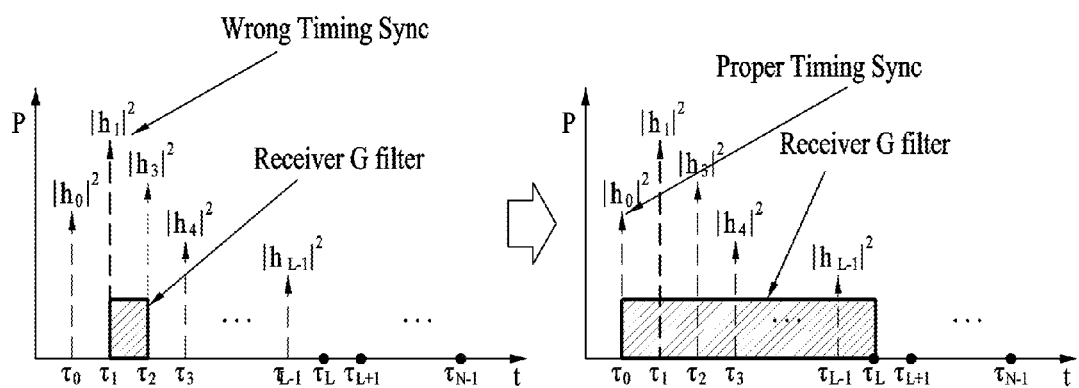
FIG. 12 illustrates accurate reception of a synchronization signal using a second detection filter in consideration of an effective channel L.

FIG. 12 illustrates accurate reception of a synchronization signal using the second detection filter in consideration of the effective channel L. FIG. 12(a) illustrates detection of RACH signals from multiple delay channels, using a detection filter being a G matrix, and FIG. 12(b) illustrates detection of accurate synchronization signals in the 2-step detection operation of the present invention.

Therefore, the BS may estimate a delay of the time synchronization $h_0$ and detect an accurate symbol timing of each UE based on the estimated delay, in addition to a synchronization signal from each UE.

Figure 13:
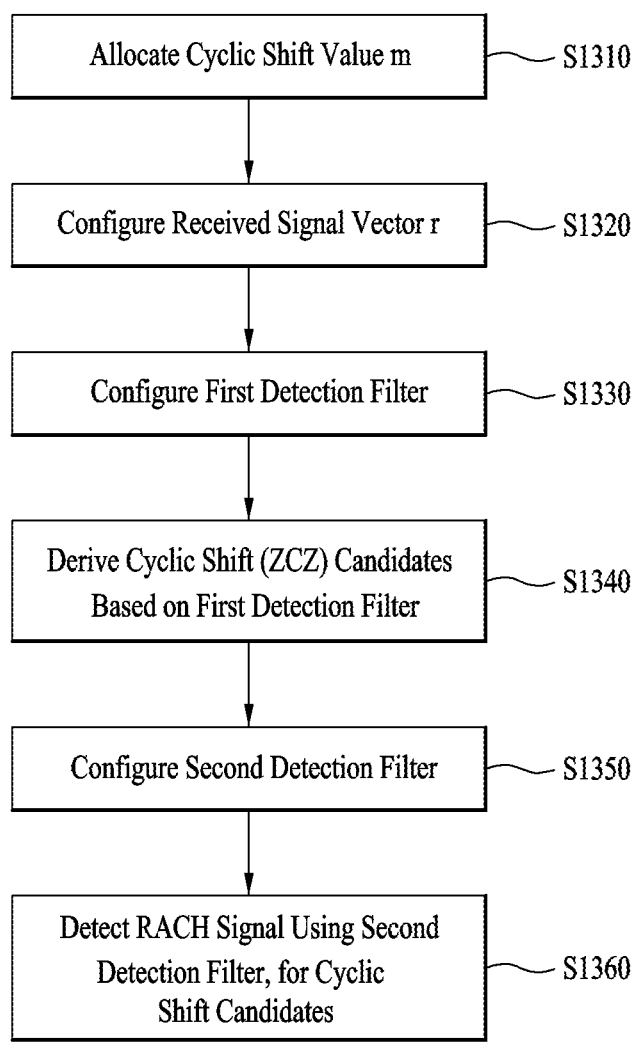
FIG. 13 illustrates one of methods for detecting an RACH signal stepwise.

FIG. 13 illustrates one of methods for detecting an RACH signal stepwise. That is, FIG. 13 depicts the 2-step RACH signal detection method described in section 3.2 from the viewpoints of a BS and a UE.

Referring to FIG. 13, a BS allocates a cyclic shift value m to each UE, which is needed for the UE to generate an RACH signal (S1310).

One or more UEs configure RACH signals using the cyclic shift values m and transmit the RACH signals to the BS. The BS receive the RACH signals from the one or more UEs on an RACH including multiple delay channels and configure a received signal vector r based on the RACH signals. The received signal vector r may be expressed as [Equation 3] (S1320).

The BS configures a first detection filter, assuming that the multiple delay channels are one effective channel. For the method for configuring a first detection filter, refer to [Equation 15] described in section 3.2.1 (S1330).

The BS derives cyclic shift (e.g., ZCZ) candidates based on the first detection filter. That is, the BS configures RACH signals having cyclic shift values equal to or larger than a reference value from among the RACH signals detected through the first detection filter, as cyclic shift value candidates (S1340).

The BS configures a second detection filter to derive accurate sequence correlation values and/or delays of the respective RACH signals. For the method for configuring a second detection filter, refer to the description of section 3.2.2, and the second detection filter may be configured according to [Equation 7]. That is, the second detection filter is configured in consideration of the number of effective channels, L (S1350).

The BS detects RACH signals for the cyclic shift value candidates derived in step S1340 using the second detection filter. That is, the BS may detect RACH signals by estimating an accurate symbol starting time of each RACH signal using the second detection filter (S1360).

In steps S1330 and S1350, the BS may configure the first detection filter and the second detection filter in every frame or subframe. However, considering system complexity, a predetermined number of first and second detection filters may be fixed used, and the system may configure a predetermined number of first and second detection filters as a fixed value. In this case, the BS may perform 2-step RACH signal detection using the first and second detection filters configured according to the cyclic shift values m.

3.2.3 Method for Detecting Multiple UEs by Stepwise RACH Signal Detection

Figure 14:
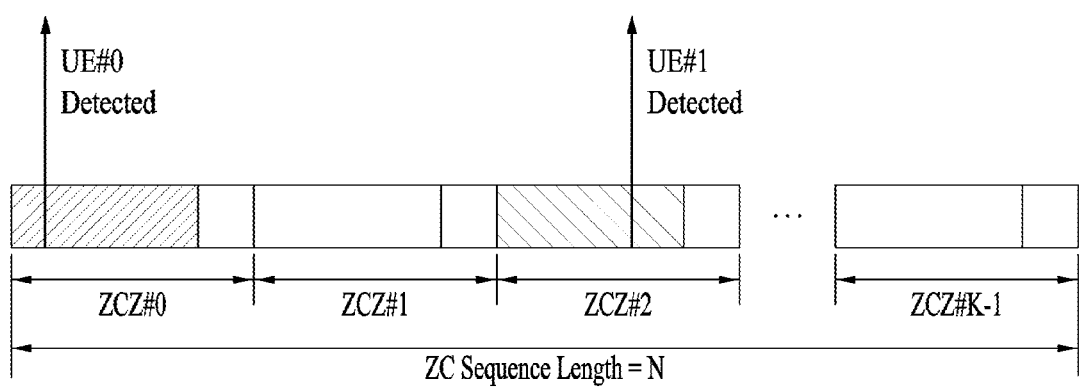
FIG. 14 illustrates a method for detecting multiple users according to an embodiment of the present invention.

It is assumed that different RACH sequences are allocated to four UEs, and the first and second UEs (UE#0 and UE#1) transmit RACH signals (i.e., RACH preambles) on an RACH. The BS acquires correlations through detection filters, as illustrated in FIG. 14. FIG. 14 illustrates a method for detecting multiple users according to an embodiment of the present invention.

Given K ZCZs in total, it is assumed that the first and second UEs are allocated first and third ZCZs, respectively. The BS may determine peak values (correlations) equal to or larger than a predetermined value have occurred in ZCZ#0 and ZCZ#2 in the afore-described first detection step. Therefore, the BS may detect transmission of RACH signals from the first and second UEs through the RACH.

Also, the BS may estimate accurate symbol starting time points of the RACH signals transmitted by the first and second UEs by performing the second detection step on the detected ZCZs.

Methods for detecting a UL synchronization signal, suitable for a communication environment using a high frequency band have been described above. The present invention has provided a method for designing a detection filter in consideration of a relationship between the channel characteristics of a high frequency band and a subcarrier spacing of a synchronization signal and has proposed a 2-step synchronization signal detection method with low complexity based on the above method.

Particularly since the high frequency band is intended for broadband communication, the period of a single sample may be extremely short on the time axis. A channel necessarily experiences multi-path delay in this environment and thus design of a suitable detection filter in consideration of the multi-path delay is essential. Therefore, the present invention has presented the basic principle of designing a multi-user synchronization signal detection filter in consideration of a multi-path channel delay, and a stepwise synchronization signal detection process based on the basic principle. Meanwhile, if a ZCZ is considered for the proposed synchronization signal detection filter, an accurate symbol timing of each UE may be estimated as well as a synchronization signal from each UE may be detected.

Finally, while the present invention relates to a specific method for detecting a UL synchronization signal, suitable for a high frequency broadband communication environment, the method is also applicable to a normal cellular cell, not limited to a small cell. That is, if a legacy cellular system uses a high frequency band, the method may be applied to the cellular system other than a small cell.

4. Apparatuses

Figure 15:
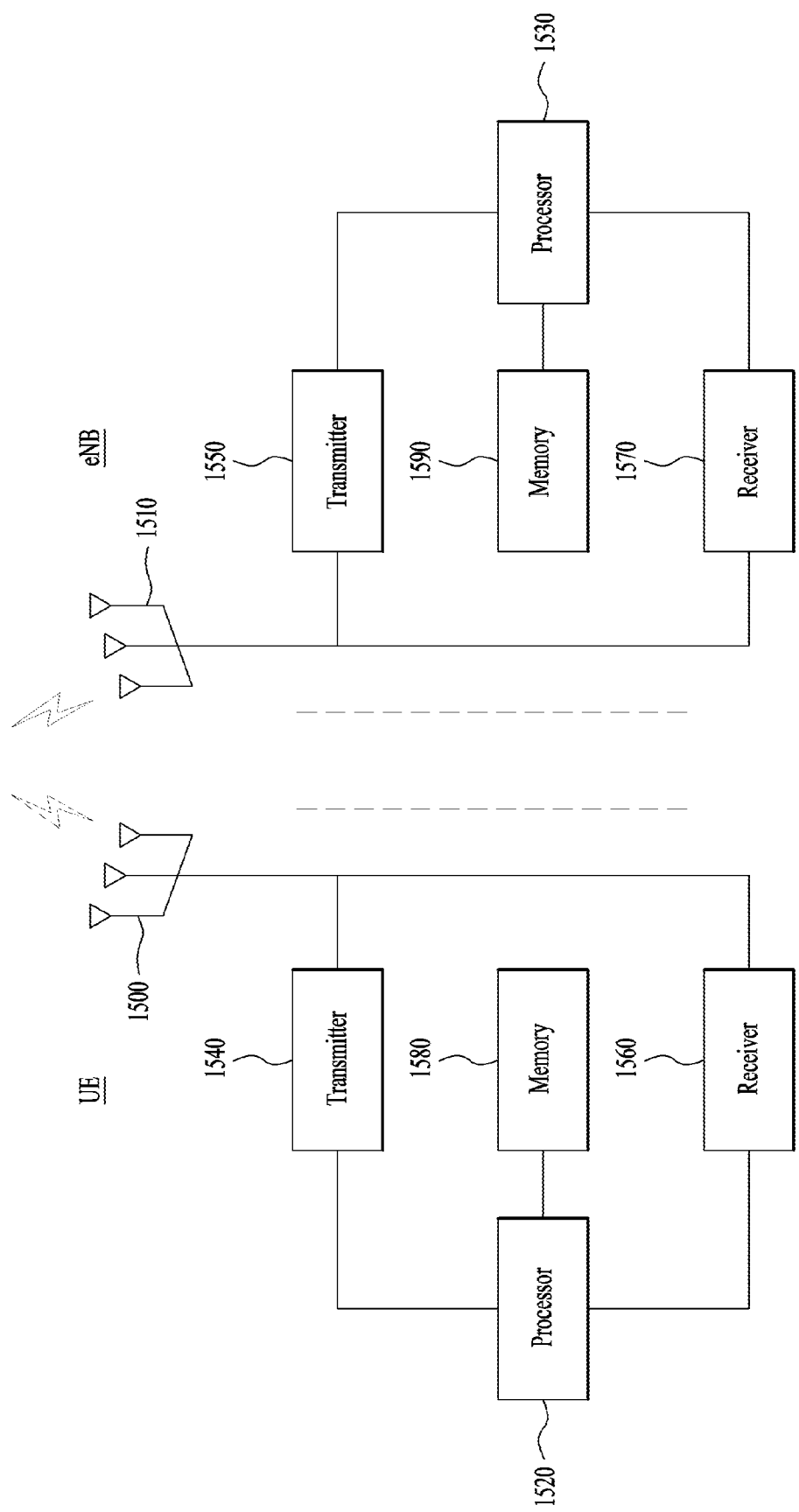
FIG. 15 is a block diagram of apparatuses that can implement the methods described in FIGS. 1 to 14.

Apparatuses illustrated in FIG. 15 are means that can implement the methods described before with reference to FIGS. 1 to 15.

A UE may act as a transmission end on a UL and as a reception end on a DL. A BS may act as a reception end on a UL and as a transmission end on a DL.

That is, each of the UE and the BS may include a Transmitter (Tx) 1540 or 1550 and Receiver (Rx) 1560 or 1570, for controlling transmission and reception of information, data, and/or messages, and an antenna 1500 or 1510 for transmitting and receiving information, data, and/or messages.

Each of the UE and the BS may further include a processor 1520 or 1530 for implementing the afore-described embodiments of the present invention and a memory 1580 or 1590 for temporarily or permanently storing operations of the processor 1520 or 1530.

Embodiments of the present invention may be implemented using the afore-described components and functions of a UE and a BS. For example, the processor of the BS may design a detection filter or perform the 2-step RACH signal detection method by combining the methods disclosed in section 1 to section 3. Also, the processor of the UE may configure an RACH signal based on a received cyclic shift value and transmit the RACH signal to the BS, for UL synchronization acquisition. For details, refer to section 3.

The Tx and Rx of the UE and the BS may perform a packet modulation/demodulation function for data transmission, a high-speed packet channel coding function, OFDMA packet scheduling, TDD packet scheduling, and/or channelization. Each of the UE and the BS of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1580 or 1590 and executed by the processor 1540 or 1530. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method for detecting a Random Access Channel (RACH) signal by a base station in a wireless access system supporting a high frequency band, the method comprising:
    allocating cyclic shift values used in the base station;
    configuring a received signal vector for signals transmitted on a RACH;
    deriving cyclic shift candidates whose correlation value between the received signal vector and a first detection filter is equal to or larger than a reference value, wherein the first detection filter corresponds to a filter on which a single effective channel is assumed; and
    detecting a RACH signal using a second detection filter, corresponding to a filter on which multiple effective channels are assumed, within the cyclic shift candidates,
    wherein the first detection filter and the second detection filter are configured based on the cyclic shift values.

2. The method according to claim 1, wherein the first detection filter is configured by $[s^{(m)_N}]$, where $s^{(i)}$ represents an N×1 Zadoff-Chu (ZC) sequence cyclically shifted by i, m represents the cyclic shift values, N represents a total length of the ZC sequence, and ⊙ represents a modulo operation.

3. The method according to claim 1, wherein the second detection filter is configured in consideration of a number of effective channels of the RACH.

4. The method according to claim 3, wherein the second detection filter is configured by $[s^{(m)_N} \; s^{(m+1)_N} \; \ldots \; s^{(m+L-1)_N}]$, where $s^{(i)}$ represents an N×1 Zadoff-Chu (ZC) sequence cyclically shifted by i, m represents the cyclic shift values, L represents a number of the multiple effective channels, N represents a total length of the ZC sequence, and ⊙ represents a modulo operation.

5. The method according to claim 1, wherein the cyclic shift values are set in consideration of a number of effective channels.

6. The method according to claim 1, wherein the cyclic shift candidates are periods during which a sequence correlation derived from a Zero Correlation Zone (ZCZ) is equal to or larger than the reference value.

7. A base station for detecting a Random Access Channel (RACH) signal in a wireless access system supporting a high frequency band, the base station comprising:
    a transmitter;
    a receiver; and
    a processor configured to detect the RACH signal,
    wherein the processor is configured to:
        allocate cyclic shift values used in the base station,
        configure a received signal vector for signals transmitted on the RACH, derive cyclic shift candidates whose correlation value between the received signal vector and a first detection filter is equal to or larger than a reference value, wherein the first detection filter corresponds to a filter on which a single effective channel is assumed, and detect a RACH signal using a second detection filter, corresponding to a filter on which multiple effective channels are assumed, within the cyclic shift candidates, and wherein the first detection filter and the second detection filter are configured based on the cyclic shift values.

8. The base station according to claim 7, wherein the first detection filter is configured by $[s^{((m)_N)}]$, where $s^{(i)}$ represents an N×1 Zadoff-Chu (ZC) sequence cyclically shifted by i, m represents the cyclic shift values, N represents a total length of the ZC sequence, and ⋄ represents a modulo operation.

9. The base station according to claim 7, wherein the second detection filter is configured in consideration of a number of effective channels of the RACH.

10. The base station according to claim 9, wherein the second detection filter is configured by $[s^{((m)_N)} \ s^{((m+1)_N)} \ldots s^{((m+L-1)_N)}]$ where $s^{(i)}$ represents an N×1 Zadoff-Chu (ZC) sequence cyclically shifted by i, m represents the cyclic shift values, L represents a number of the multiple effective channels, N represents a total length of the ZC sequence, and ⋄ represents a modulo operation.

11. The base station according to claim 7, wherein the cyclic shift values are set in consideration of a number of effective channels.

12. The base station according to claim 7, wherein the cyclic shift candidates are periods during which a sequence correlation derived from a Zero Correlation Zone (ZCZ) is equal to or larger than the reference value.

* * * * *